United States Patent [19]

Kuegler

[11] Patent Number: 5,624,208
[45] Date of Patent: Apr. 29, 1997

[54] PROCESS FOR SEALING SOIL FORMATIONS

[76] Inventor: Jost-Ulrich Kuegler, Im Teelbruch 61, 45219 Essen, Germany

[21] Appl. No.: 532,794
[22] PCT Filed: Feb. 14, 1995
[86] PCT No.: PCT/EP95/00539
§ 371 Date: Oct. 6, 1995
§ 102(e) Date: Oct. 6, 1995
[87] PCT Pub. No.: WO95/21966
PCT Pub. Date: Aug. 17, 1995

[30] Foreign Application Priority Data

Feb. 14, 1994 [DE] Germany ............ 44 04 644.8

[51] Int. Cl.⁶ .......... E02D 3/02; E02D 3/046; E02D 3/12; C09K 17/12
[52] U.S. Cl. .......... 405/263; 405/271; 106/633
[58] Field of Search .......... 405/128, 129, 405/263, 270, 271; 106/633

[56] References Cited

U.S. PATENT DOCUMENTS

| 3,732,697 | 5/1973 | Dickson ............ 405/129 |
| 4,043,830 | 8/1977 | Suzuki . | |
| 4,056,937 | 11/1977 | Suzuki . | |
| 5,040,920 | 8/1991 | Forrester ............ 405/129 |
| 5,090,843 | 2/1992 | Grigsby ............ 405/263 X |
| 5,201,608 | 4/1993 | Kügler ............ 405/263 X |
| 5,374,139 | 12/1994 | Kügler ............ 405/263 X |

FOREIGN PATENT DOCUMENTS

| 936559 | 4/1957 | Germany . |
| 1517342 | 4/1970 | Germany . |
| 2600625 | 7/1977 | Germany . |
| 2702787 | 7/1978 | Germany . |
| 3709778 | 10/1988 | Germany . |
| 8901547 | 2/1989 | WIPO . |

Primary Examiner—George A. Suchfield
Attorney, Agent, or Firm—Bardehle, Pagenberg, Dost, Altenburg, Frohwitter, Geissler & Partners

[57] ABSTRACT

A process for sealing soil formations, wherein a mineral sealing layer of a cohesive soil with the addition of powdery silicate of sodium is applied and mechanically compacted, and wherein: (a) firstly a homogenous mixture is prepared from a cohesive soil having a water in the wet area of the Proctor curve, with the addition of a powdery, aluminate-free soft gel-forming agent; (b) when the soft gel-forming agent has dissolved in the groundwater, powdery silicate of sodium is incorporated in homogeneously; and (c) finally the mixture is mechanically compacted.

10 Claims, 6 Drawing Sheets

FIG. 2

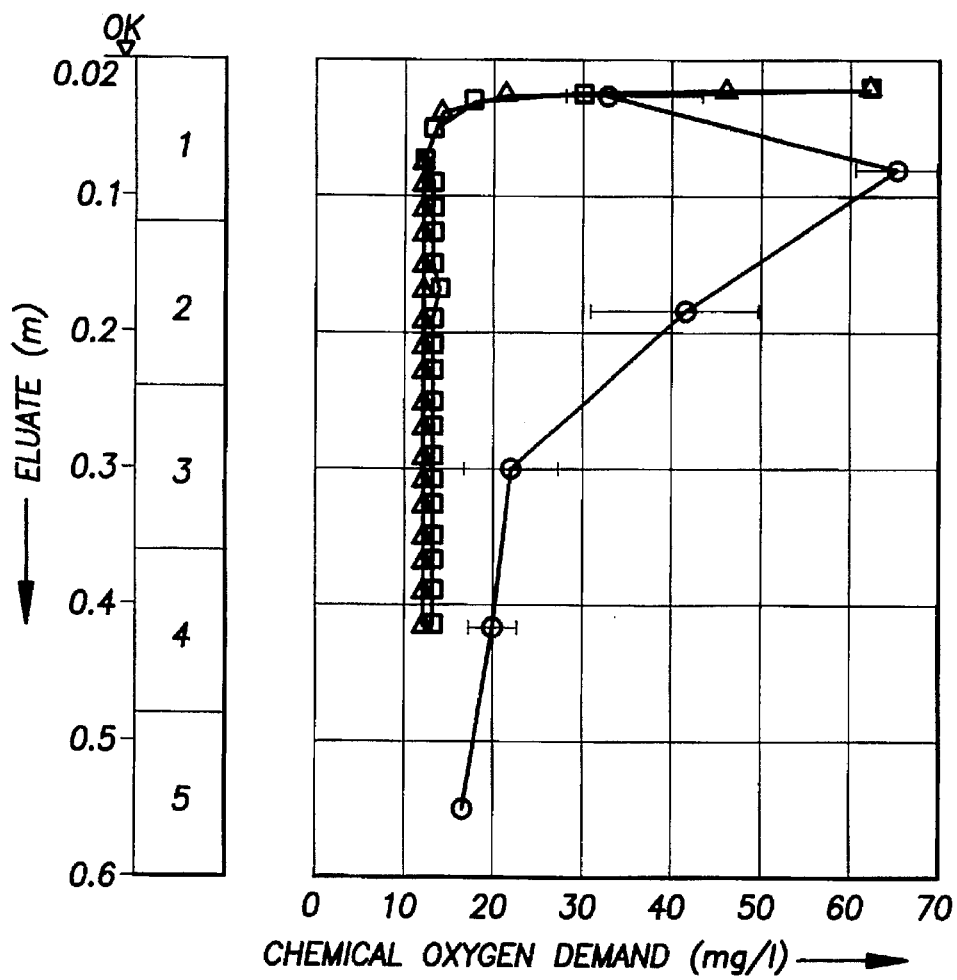

FIGURE 2: CONCENTRATIONS AS A FUNCTION OF THE PENETRATION DEPTH

[1]−[5] LAYER SAMPLES TAKEN (h=0.12m) TO DETERMINE THE PENETRATION OF HARMFUL SUBSTANCES INTO DIFFERENT DEPTHS

- MINERAL SEALING MATERIAL: CLAY ○
  (GELDERN-PONT RESIDENTIAL WASTE DUMP, 6 YEARS OF ADDITIONAL IMPOUNDMENT OF DUMP SEEPAGE WATER)

- LOESS LOAM MODIFIED WITH WATERGLASS WITH SODIUM BICARBONATE AS THE AGENT WHICH FORMS A GEL ($k_f = 2.5 \times 10^{-11}$ m/s, 6 YEARS ADDITIONAL IMPOUNDMENT WITH SIMULATED DUMP SEEPAGE WATER)
  TEST SPECIMAN 1 △
  TEST SPECIMAN 2 □

FIG.3

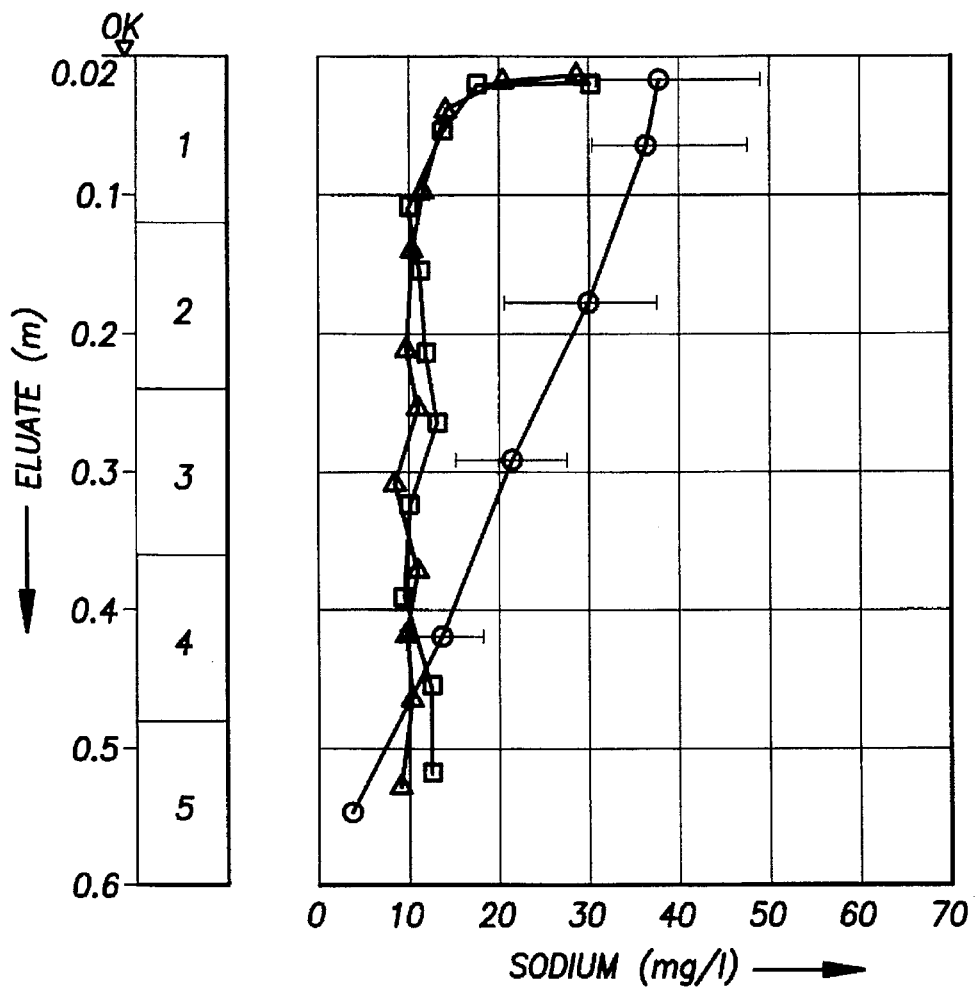

FIGURE 2: CONCENTRATIONS AS A FUNCTION OF THE PENETRATION DEPTH

1 – 5 LAYER SAMPLES TAKEN (h=0.12m) TO DETERMINE THE PENETRATION OF HARMFUL SUBSTANCES INTO DIFFERENT DEPTHS

- MINERAL SEALING MATERIAL: CLAY ○
  (GELDERN–PONT RESIDENTIAL WASTE DUMP, 6 YEARS OF ADDITIONAL IMPOUNDMENT OF DUMP SEEPAGE WATER)

- LOESS LOAM MODIFIED WITH WATERGLASS WITH SODIUM BICARBONATE AS THE AGENT WHICH FORMS A GEL ($k_f = 2.5 \times 10^{-11}$ m/s, 6 YEARS ADDITIONAL IMPOUNDMENT WITH SIMULATED DUMP SEEPAGE WATER)
  TEST SPECIMAN 1 △
  TEST SPECIMAN 2 □

FIG. 4

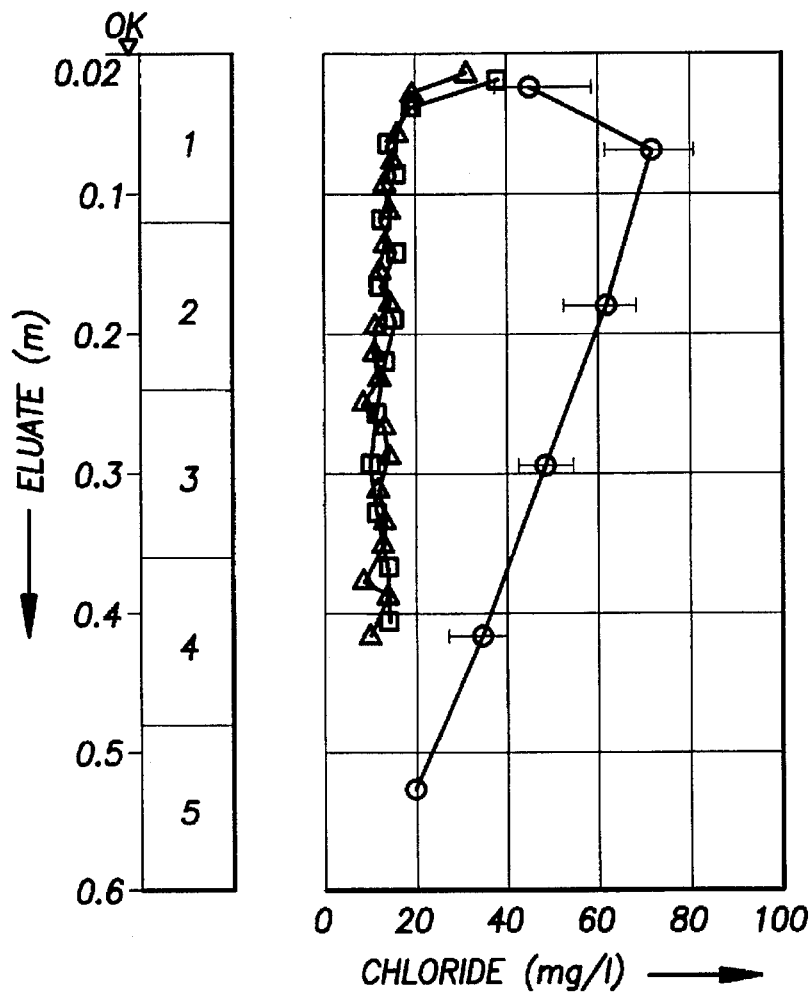

FIGURE 2: CONCENTRATIONS AS A FUNCTION OF THE PENETRATION DEPTH

[1] – [5] LAYER SAMPLES TAKEN (h=0.12m) TO DETERMINE THE PENETRATION OF HARMFUL SUBSTANCES INTO DIFFERENT DEPTHS

- MINERAL SEALING MATERIAL: CLAY O
  (GELDERN-PONT RESIDENTIAL WASTE DUMP, 6 YEARS OF ADDITIONAL IMPOUNDMENT OF DUMP SEEPAGE WATER)

- LOESS LOAM MODIFIED WITH WATERGLASS WITH SODIUM BICARBONATE AS THE AGENT WHICH FORMS A GEL ($k_f = 2.5 \times 10^{-11}$ m/s, 6 YEARS ADDITIONAL IMPOUNDMENT WITH SIMULATED DUMP SEEPAGE WATER)
  TEST SPECIMAN 1 △
  TEST SPECIMAN 2 □

FIG.5

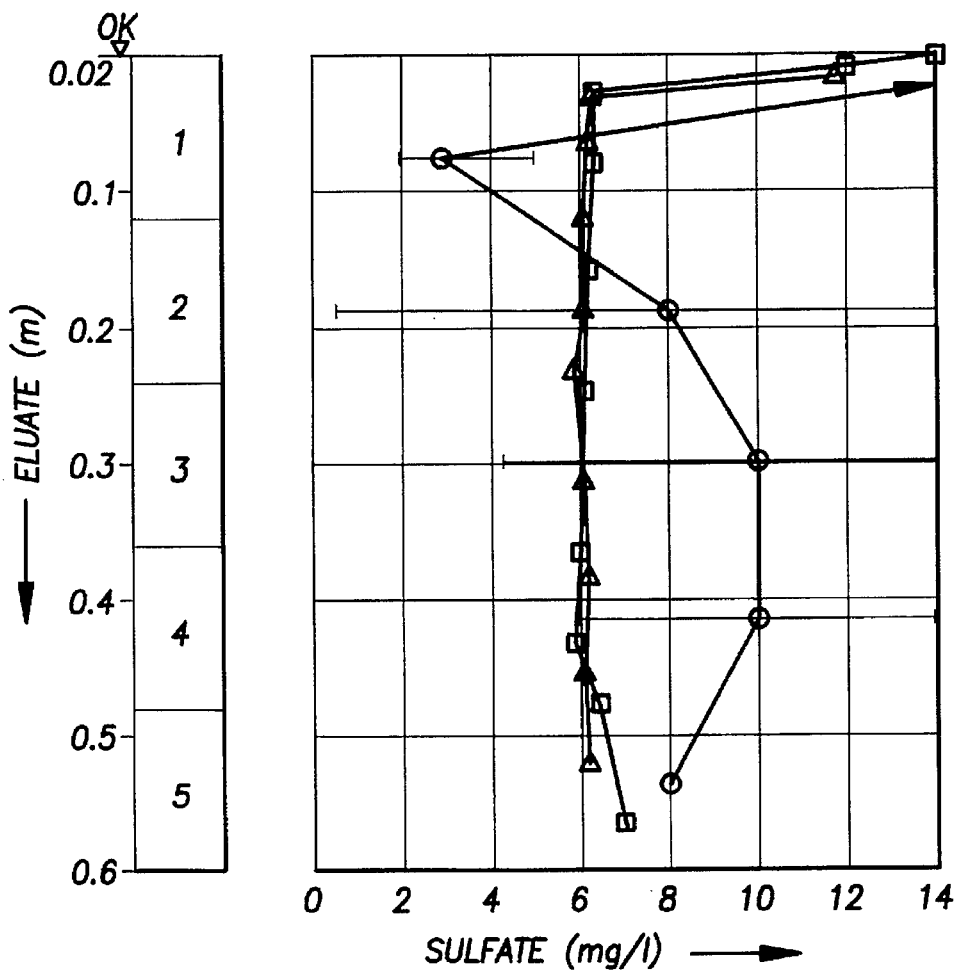

FIGURE 2: CONCENTRATIONS AS A FUNCTION OF THE PENETRATION DEPTH

1 – 5 LAYER SAMPLES TAKEN (h=0.12m) TO DETERMINE THE PENETRATION OF HARMFUL SUBSTANCES INTO DIFFERENT DEPTHS

- MINERAL SEALING MATERIAL: CLAY ○
  (GELDERN-PONT RESIDENTIAL WASTE DUMP, 6 YEARS OF ADDITIONAL IMPOUNDMENT OF DUMP SEEPAGE WATER)

- LOESS LOAM MODIFIED WITH WATERGLASS WITH SODIUM BICARBONATE AS THE AGENT WHICH FORMS A GEL ($k_f = 2.5 \times 10^{-11}$ m/s, 6 YEARS ADDITIONAL IMPOUNDMENT WITH SIMULATED DUMP SEEPAGE WATER)
  TEST SPECIMAN 1 △
  TEST SPECIMAN 2 □

FIG.6

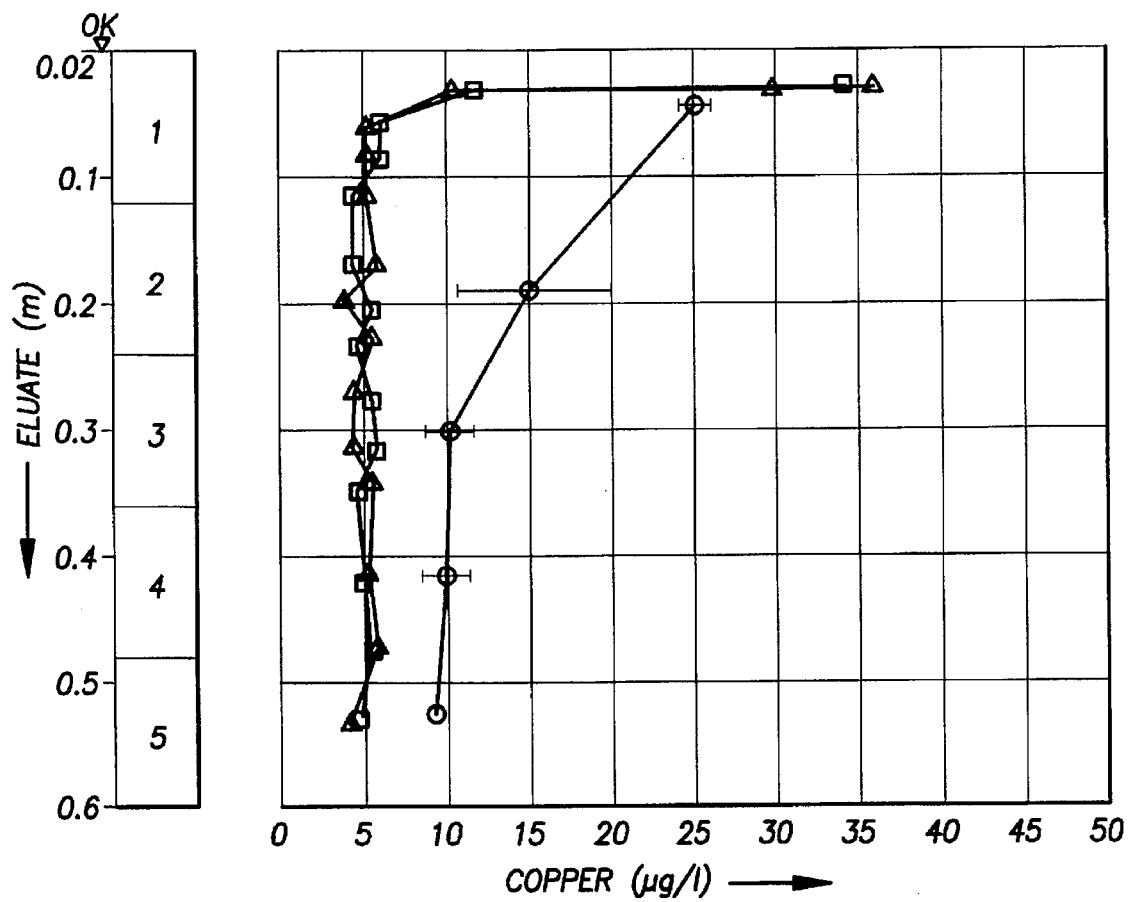

FIGURE 2: CONCENTRATIONS AS A FUNCTION OF THE PENETRATION DEPTH

[1] – [5] LAYER SAMPLES TAKEN (h=0.12m) TO DETERMINE THE PENETRATION OF HARMFUL SUBSTANCES INTO DIFFERENT DEPTHS

- MINERAL SEALING MATERIAL: CLAY O
  (GELDERN-PONT RESIDENTIAL WASTE DUMP, 6 YEARS OF ADDITIONAL IMPOUNDMENT OF DUMP SEEPAGE WATER)

- LOESS LOAM MODIFIED WITH WATERGLASS WITH SODIUM BICARBONATE AS THE AGENT WHICH FORMS A GEL ($k_f$ = $2.5 \times 10^{-11}$ m/s, 6 YEARS ADDITIONAL IMPOUNDMENT WITH SIMULATED DUMP SEEPAGE WATER)
  TEST SPECIMEN 1  △
  TEST SPECIMAN 2  □

PROCESS FOR SEALING SOIL FORMATIONS

BACKGROUND OF THE INVENTION

The invention relates to a process for sealing soil formations in which a mineral sealing layer of a cohesive soil is applied, with addition of pulverulent waterglass, and is compacted mechanically.

Such a process using mineral sealing layers of naturally occurring soils is known from DE-C-27 02 787. By using pulverulent waterglass, the permeability coefficients $k_f$ of the mineral sealing layer can be improved to values in the range from 3.6 to $1.3 \times 10^{-10}$ m/s.

A process for sealing soil formations in which sewage sludge or sludge from waters is mixed with 30 to 70% by weight, based on the sludge dry weight, of additive of stable grain which is capable of absorbing water and the resulting synthetic soil mixture is applied to the soil formation and compacted mechanically is furthermore known from EP-B 338 039. In a particular embodiment, it is intended here to carry out the process with the addition of sodium aluminate as an agent which forms a soft gel and pulverulent waterglass, the waterglass initially being mixed into the mixture in the dry form and the agent which forms a soft gel being mixed in by a further processing operation only after the waterglass has dissolved. Permeability coefficients $k_f$ of $5 \times 10^{-10}$ to $3 \times 10^{-11}$ m/s are stated for this synthetic soil system.

However, the process described in EP-B 338 039 has certain limitations, in particular because there are environmental objections because of the high content of harmful substances in the sewage sludge and its additives (such as power station ashes or refuse incineration ashes). Thus, for example, the use of such sewage sludge mixtures is not approved for base seals but only for top seals of dumps because of the high content of harmful substances. Apart from these limitations for certain synthetic soils, on the other hand, natural soils, such as clay-containing soils, which are most suitable for such seals and are approved per se for base seals, do not have an adequate harmful substances retention capacity in the long term and additionally undergo physicochemical change, which leads to an increase in permeability in the long term. This is also the reason for the development of the combi-seal in which a sealing web of plastic is provided over the clay sealing layer.

SUMMARY OF THE INVENTION

It has now been found that excellent permeability coefficients with a simultaneously good harmful substances retention capacity can be achieved when sealing with naturally occurring cohesive soils if (a) a homogeneous mixture is first prepared with a cohesive soil having a water content in the wet region of the Proctor curve, with addition of a pulverulent agent which forms a soft gel, (b) after the agent which forms a soft gel has dissolved in the soil water, pulverulent water-glass is incorporated homogeneously, and (c) the mixture is finally compacted mechanically.

The success of this process is surprising because in the process of the abovementioned EP-B 338 039 it is expressly specified that the waterglass must first be mixed in and the liquid agent which forms a soft gel can be mixed in by a further processing operation only after the waterglass has dissolved (column 5, lines 45–50 and Patent claim 11).

BRIEF DESCRIPTION OF THE DRAWINGS

FIG. 2 is a chart depicting chemical oxygen demand as a function of the penetration depth of harmful substances.

FIG. 3 is a chart depicting sodium concentration as a function of the penetration depth.

FIG. 4 is a chart depicting chloride concentration as a function of the penetration depth.

FIG. 5 is a chart depicting sulfate concentration as a function of the penetration depth.

FIG. 6 is a chart depicting copper concentration as a function of the penetration depth.

Figure 1:
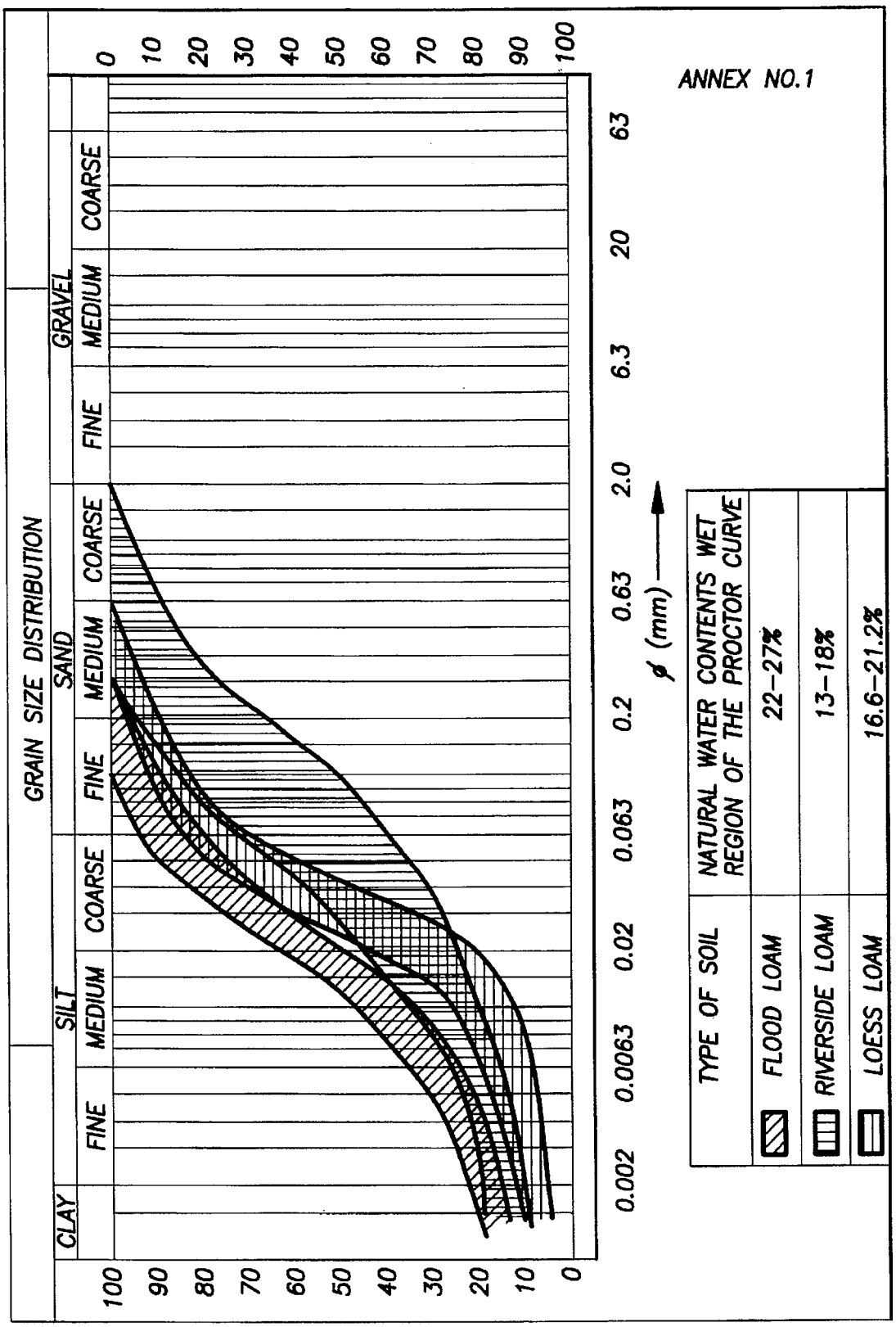
FIG. 1 shows the grain size distribution for different types of soil used in the working examples.

Permeability coefficients in the range from $k_f = 5 \times 10^{-11}$ to $1 \times 10^{-12}$, depending on the type of soil chosen, can be achieved with the process of the invention. A particular advantage is furthermore that with all the fine-grained cohesive types of soil chosen (sandy silt to clay), the finished sealing layer is distinguished by a particularly high harmful substances retention capacity, in particular in respect of both inorganic and organic harmful substances. In this respect, the values for the generally acknowledged clay seals are exceeded by far, as can be seen from the accompanying FIGS. 2 to 6. This high harmful substances retention capacity is of very great importance with regard to long-term protection of ground water against the action of dump seepage waters. Since the sealing layers prepared by the process of the invention are equivalent in respect of their harmful substances retention capacity to the more expensive combination seals comprising a sealing web of plastic and a mineral clay-containing sealing layer, these combination seals can be replaced by the sealing layers prepared according to the invention, which is accompanied by considerable savings in costs and better structural engineering advantages with regard to their ease of preparation.

Examples of agents which form a soft gel and are suitable according to the invention are sodium bicarbonate, sodium acetate and sodium hydrogen phosphate. Sodium bicarbonate is preferred, in particular because there may be objections to phosphates and acetates for environmental reasons. However, mixtures of the agents which form a soft gel are also used in some cases.

The agent which forms a soft gel is used in pulverulent form, in general in an amount of 1 to 10% by weight, based on the amount of free soil water, preferably in an amount of 2 to 8% by weight, and in particular 3 to 6% by weight. The term "pulverulent" here means a finely divided dry form, that is to say also includes the flocculent form and the like. The same applies to the pulverulent waterglass.

The pulverulent waterglass is in general used in an amount of 1 to 10% by weight, preferably 2 to 8% by weight, and in particular 3 to 6% by weight, in each case based on the amount of free soil water. Both sodium and potassium waterglasses are suitable. Sodium waterglasses are preferred because of their cheapness. A high concentration of $SiO_2$ and a good solubility is to be ensured here.

A particularly suitable commercial product is obtainable under the name "DEPOSIL N."

The waterglass and agent which forms a soft gel are in general used in a weight ratio of 2:1 to 1:2. A weight ratio of about 1:1 is particularly preferred here. The waterglass and agent which forms a soft gel evidently influence each other, since if waterglass is used by itself or the agent which forms a soft gel is used by itself, even in relatively large amounts, the good values in respect of permeability coefficient and retention of harmful substances observed according to the invention cannot be achieved in the short term.

Examples of cohesive soils which are suitable according to the invention are fine-grained soils and mixed-grain soils according to DIN 18196. By definition, these include clay, silt, sand/clay mixtures, sand/silt mixtures, gravel/clay mixtures and gravel/silt mixtures and mixtures thereof with one another. These can be naturally occurring or synthetic soils.

The cohesive soils used according to the invention are to be processed and compacted with a water content in the wet region of the Proctor curve. The Proctor value here is in general in the range from 100 to 85%, and preferably 91 to 97%, Proctor values in the range from 92 to 95% being particularly preferred. These Proctor values are determined in accordance with DIN 18127. In this procedure, a given soil is introduced into a cylinder and rammed down with a standardized energy. A certain compaction of the soil is then obtained, depending on the water content of the soil. From the densities determined for the soil and from the density values assigned to the various water contents, the so-called Proctor curve is obtained with a density maximum for a certain water content and, decreasing on both sides of this maximum, density values for lower water contents (dry region) and for higher water contents (wet region). Exclusively soils having a water content in the wet region of the Proctor curve are used according to the invention. If the water content of the cohesive soil is not adequate, it is brought to a suitable value by sprinkling. On the other hand, in the case of particularly high water contents, prior drying may be of advantage in order to bring the water content into the preferred region of the Proctor curve. This can also be achieved, for example, by admixing extremely fine-grained dry additives, such as dusts or ground clays.

The quality of the seal also depends on the grain size distribution of the soil. Thus, for example, riverside loam has a more favourable grain size distribution than loess loam, and for this reason—under otherwise identical conditions—a better sealing value can be achieved in principle with riverside loam than with loess loam (cf. also the embodiment examples below). Depending on the starting soil to be used, it may therefore be preferable to improve relatively even-grained soils in respect of grain size distribution by addition of dry additives, such as inactive kaolinitic ground clays.

The pH of the soil in itself does not play a particular role. The pH of naturally occurring soils is always in a range from 4 to 9, in general even 5.5 to 8, so that no particular measures are necessary. In the case of synthetic soils, however, it may be that a pH which lies outside the abovementioned range of 4 to 9 results, depending on the additives used. In this case, it will then be necessary to correct the pH accordingly by addition of appropriate acid or basic additives or also agents.

In carrying out the process of the invention, a homogeneous mixture is initially prepared from the cohesive soil, with the addition of the pulverulent agent which forms a soft gel, in step (a). Homogeneous here means that after mixing, a uniform grain size distribution is present in the entire material, and that the pulverulent agent which forms a gel is also distributed uniformly in this mixture. This is the case if the water content and the grain composition in the individual grain size ranges of clay, silt and sand lie within a variation coefficient of about 10%.

The agent which forms a soft gel is dissolved in the free soil water. The dissolving lasts many hours and takes up to a whole day=24 hours. For certainty, on the construction site the waterglass is therefore added (stage (b) of the process) only on the following day, so that good distribution of the agent which forms a soft gel in the soil mixture can be expected. However, dissolving of the agent which forms a soft gel can be accelerated by subjecting the mixture of cohesive soil and agent which forms a soft gel to mechanical compaction with simultaneous vibration. Vibrating rolls or vibrating plates are preferably used for this. In this embodiment, dissolving of the agent which forms a soft gel in the free soil water can be shortened to 4 to 6 hours. This advantage of saving in time in general outweighs the disadvantage of undertaking an additional working step, so that this method of working is preferred in practice. Another advantage is the greater independence with regard to unpredictable changes in weather.

To achieve the homogeneous mixture in stage (a), a procedure can alternatively be followed in which the cohesive soil is first homogenized and the agent which forms a soft gel is then mixed in homogeneously. However, in the case of readily homogenizable soils, the homogeneous mixture can also be prepared in one working operation.

The homogenization or thorough mixing of the soil or of the soil with the agent which forms a soft gel can be carried out directly, for example, in the existing soil layer by means of earth rotivation i.e., the mixing of the soil to a certain depth. Thorough mixing by means of a positive mixer is particularly advisable for soils which are difficult to mix thoroughly, for example with a very high cohesion.

After the agent which forms a soft gel has been dissolved in the soil water, the pulverulent waterglass is mixed in homogeneously. The same conditions as described above for mixing in the agent which forms a soft gel apply to this.

After the waterglass has been mixed in homogeneously, the mixture obtained in stage (b) can be compacted mechanically directly in stage (c). Preferably, however, the mixture is left to stand for a certain period of time, for example 1 to 4 hours, between stages (b) and (c), which is intended to result in the best possible reactivity of the waterglass. The mixture is then incorporated and compacted.

The invention described, of preparing a sealing soil with retention of harmful substances, also shows solutions in respect of making waste loads safe over the area of use in the field of sealing technology. Thus, for example, soils loaded with harmful substances can be mixed homogeneously and compacted with a sealing mixture prepared in this way in a ratio of, for example, 3:1 or 1:1. Such a mixture shows a high retention of harmful substances in its eluate properties.

If such sealing mixtures are to be employed in structural engineering under road or industrial soils for double protection from elution, additional modification with cement can improve the load-bearing properties without impairing the eluate properties, so that mixtures modified in this way can also be employed as building materials, for example for the preparation of load-bearing layers under roads and buildings. From these aspects of eluting properties, residual substances which are an environmental hazard can thus also be deposited safely on inert dumps or remain on the construction site, provided that the treatment described is carried out.

The invention is explained below with the aid of the examples.

It is known from the prior art that sealing layers can be constructed from clay-containing silt soils. The silt soils can be classified into 3 ranges in respect of grain composition:
1) Loess soils (loess loam)
   From the grain distribution, this is chiefly a medium to coarse silt, a relatively even-grained soil which has fine sand contents of 10–20% and clay contents of 3–9%.
2) Sandy to highly sandy silt (riverside loam)
   This is a soil with sand contents of 25–60%, and in the silt range a relatively constant grain size distribution of all the ranges from fine to coarse silt and various clay contents of 12–20%.
3) Flood loams
   These are sandy to finely sandy silts with a clay content of between 16 and 25% and a sand content of 5–20%. The silt range likewise runs constant in the grain size distribution.

For the preparation of base sealing layers, the loess loams are the most difficult to treat from the soil engineering and sealing point of view, because they have a high grain evenness and therefore cause a high variability in respect of plasticity with small variations in water content, and because of the grain evenness have soil pores of equal size which are not filled by finer soil particles of the same type of soil. If such soil layers are improved in respect of their permeability coefficient, they must therefore be treated with additives such as ground clay, bentonite or waterglass. The permeability coefficients which can be achieved in these types of soil by the improvements mentioned are $k_f \approx 1 \times 10^{-10}$ m/s.

The experiments were carried out with the three above-mentioned types of loam, the grain size distributions of which can be seen from FIG. 1. FIG. 1 also shows the natural water content of the loam soils. With this water content, the soils mentioned are in the wet region of the Proctor curve, so that no particular measures are to be resorted to in this respect.

The soil samples were processed as follows:

The earth-damp soil with the water content mentioned was first mixed by positive mixing in a manner such that by visual evaluation the soil mixture was homogeneous in respect of the water content and grain structure. The agents which form a gel mentioned in Table I were added to this homogeneous soil mixture in amounts of 5%, based on the free soil water. The agents which form a gel were distributed uniformly in the homogeneous soil mixture by positive mixing.

After the agent which forms a soft gel had dissolved (5 to 6 hours in the laboratory experiment), dry waterglass powder (sprayed waterglass powder) having an $SiO_2$ content of about 60% (sodium waterglass, "DEPOSIL N," Henkel) was added to the soil mixture in an amount such that a 5% strength waterglass solution was established in the soil water. The waterglass—like the agent which forms a gel before—was distributed uniformly in the soil by intensive mixing and, after 1 hour, the mixture was compacted in a Proctor pot with the standardized Proctor energy according to DIN.

Because of the water content present, a Proctor density of $\approx 93\%$ was established on application of the Proctor energy.

In preliminary experiments on compacted soil samples, it was demonstrated that a uniform distribution of the soil water and of the agent which forms a gel and the waterglass in the soil water is ensured by the procedure described above.

It was furthermore found in the experiments that faster distribution in the soil water results from ramming down the soil sample mixed thoroughly with the agents which form a gel and subsequent vibration on a vibrating bench. The same also applies to incorporation of the waterglass.

The results are summarized in Table I.

TABLE I

Permeability coefficients of a fine sandy medium to coarse silt modified with waterglass, clay content 8% (loess loam) (5% of waterglass powder and 5% of agent which forms a gel, based on the soil water (19.5%)) as a function of the various agents which form a gel and a different sequence of the steps of addition of waterglass and agents which form a gel.

| Agent which forms a gel | Experiment No. | First waterglass then agent which forms a gel $k_f$ value [m/s] | Experiment No. | First agent which forms a gel, then waterglass $k_f$ value [m/s] |
|---|---|---|---|---|
| Na aluminate | 1a | $3 \times 10^{-10}$ – $4.5 \times 10^{-10}$ | 1b | $7 \times 10^{-10}$ – $9 \times 10^{-10}$ |
| Na bicarbonate | 2a | $9 \times 10^{-10}$ – $1.5 \times 10^{-10}$ | 2b | $3.5 \times 10^{-11}$ – $8 \times 10^{-12}$ |
| Na hydrogen phosphate | 3a | $1.3 \times 10^{-10}$ – $2.3 \times 10^{-10}$ | 3b | $4 \times 10^{-11}$ – $9.5 \times 10^{-12}$ |
| Na acetate | 4a | $1.1 \times 10^{-10}$ – $1.9 \times 10^{-10}$ | 4b | $3.5 \times 10^{-11}$ – $9.5 \times 10^{-12}$ |
| 90% Na bicarbonate/ 10% Na hydrogen phosphate | 5a | $1.2 \times 10^{-10}$ – $1.8 \times 10^{-10}$ | 5b | $4.5 \times 10^{-11}$ – $9.0 \times 10^{-12}$ |
| 95% Na bicarbonate/ 5% Na acetate | 6a | $1.1 \times 10^{-10}$ – $1.7 \times 10^{-10}$ | 6b | $5.8 \times 10^{-11}$ – $9.8 \times 10^{-12}$ |

Experiments 2b to 6b in Table I are experiments according to the invention and experiment 1b is a control experiment. Experiment 1a is a comparison experiment of the prior art according to EP-B 338 039, and experiments 2a to 6a are again control experiments.

It can be seen that in experiments 2b to 6b according to the invention, $k_f$ values of at least $6 \times 10^{-11}$ and up to $8 \times 10^{-12}$ are achieved. In control experiment 1b, the result is at least one order of magnitude poorer, and comparison experiment 1a according to the prior art also does not give better results. Finally, it can be seen that control experiments 2a to 6a (experiments a and b are to be compared in each case, that is to say 2a with 2b and the like) also without exception do not give results better than $1 \times 10^{-10}$. This result is surprising and shows that only the combination of aluminate-free agent which forms a soft gel with the specific procedure according to the invention, i.e. first mixing in the agent which forms a soft gel and only then addition of the waterglass, gives the outstanding sealing values in the range from $k_f = 10^{-11}$ to $10^{-12}$.

Since loess loam is a relatively even-grained soil, and in contrast riverside loam and flood loam have a broader grain size distribution (cf. FIG. 1), better permeability coefficients ($k_f$ values) should be achievable per se with riverside loam and flood loam under otherwise identical conditions. $k_f$ values improved in this way were in fact found, as can be seen from the data of Table II. The experimental conditions were exactly the same as when loess loam was used (see Table I).

TABLE II

| Agent which forms a gel | Experiment No. | First agent which forms a gel, then waterglass $k_f$ value [m/s] |
|---|---|---|
| Highly sandy silt (riverside loam), water content 17% | | |
| Na aluminate | 1c | $4.3 \times 10^{-10}$ – $9.5 \times 10^{-11}$ |
| Na bicarbonate | 2c | $2.1 \times 10^{-11}$ – $6.2 \times 10^{-12}$ |
| Na hydrogen phosphate | 3c | $3.5 \times 10^{-11}$ – $7.4 \times 10^{-12}$ |
| Na acetate | 4c | $2.9 \times 10^{-11}$ – $8.8 \times 10^{-12}$ |
| 90% Na bicarbonate/10% Na hydrogen phosphate | 5c | $1.2 \times 10^{-11}$ – $6.5 \times 10^{-12}$ |

TABLE II-continued

| Agent which forms a gel | Experiment No. | First agent which forms a gel, then waterglass $k_f$ value [m/s] |
|---|---|---|
| 95% Na bicarbonate/5% Na acetate | 6c | — |
| Flood loam, water content 23% | | |
| Na aluminate | 1d | $1.8 \times 10^{-10} - 8.8 \times 10^{-11}$ |
| Na bicarbonate | 2d | $9.5 \times 10^{-12} - 4.3 \times 10^{-12}$ |
| Na hydrogen phosphate | 3d | $9.8 \times 10^{-12} - 6.7 \times 10^{-12}$ |
| Na acetate | 4d | $9.2 \times 10^{-12} - 7.4 \times 10^{-12}$ |
| 90% Na bicarbonate/10% Na hydrogen phosphate | 5d | $1.1 \times 10^{-11} - 6.4 \times 10^{-12}$ |
| 95% Na bicarbonate/5% Na acetate | 6d | $8.3 \times 10^{-11} - 4.4 \times 10^{-12}$ |

In the case of the results of Table II, experiments 1c and 1d are control experiments which correspond to control experiment 1b of Table I. Experiments 2c to 5c and 2d to 5d are to be compared with experiments 2b to 5b in Table I; experiment 6d is to be compared with experiment 6b of Table I (experiment 6c could not be measured because of equipment failure).

It can be seen from Table II that the $k_f$ values with riverside loam and flood loam overall are somewhat better than when loess loam is used (Table I).

To test the harmful substances retention capacity of the sealing layers prepared according to Table I, the penetration properties with respect to simulated dump seepage water were investigated over a period of 6 years. For this purpose, the loess loam modified according to the invention with an agent which forms a soft gel and waterglass and having $k_f$ values of about 7 to $3 \times 10^{-11}$ m/s was incorporated into permeability test apparatuses (Triax apparatuses) and charged with a simulated dump seepage water in accordance with G. Friesicke; "Deponiesickerwasser—was ist das, was sollte damit geschehen? [Dump seepage water—what is it and what should be done with it?]" in the LWA annual report '85 as the test liquid of i=20.

The composition of the simulated dump seepage water is shown in Table III. The ranges of variation such as also occur in real dump seepage waters have been taken into account here; i.e. 10 different seepage waters which cover the entire ranges stated in Table III were used.

TABLE III

| Composition of the simulated dump seepage water | |
|---|---|
| pH | 4–9 |
| Conductivity | 10,000–30,000 μS/m |
| $Na^+$ | 4.0 g/l–8.0 g/l |
| $Ca^{++}$ | 2.0 g/l–6.0 g/l |
| $Cl^-$ | 2.0 g/l–10 g/l |
| $Cu^{2+}$ | 0.5 mg/l–20.0 mg/l |
| Sulphate | 1.0–3.0 g/l |
| COD (chemical oxygen demand) | 3 g/l–9.0 g/l |

The results are summarized in FIGS. 2 to 6. In comparison with this, the penetrations of harmful substances for a sealing layer of clay, the $k_f$ value of which must be $<1 \times 10^{-10}$ m/s according to the approval conditions in force (residence time 6 years), are shown in the figures. This is the base seal of a residential waste dump with direct additional impoundment of seepage water (Geldern-Pont dump).

FIGS. 2 to 6 show the following: It can clearly be seen that noticeable depths of penetration of the harmful substances were found in the clay bodies. In comparison with this, a penetration of the harmful substances can be detected in the same period of time in the present invention, which is of considerable importance. The penetration of the parameters investigated —see FIGS. 2–6—is up to about 2.0 cm, for example, in the invention, while in the clay seals penetration depths of up to about 30 cm or more can be detected during the same period. In this connection, it should be pointed out that the penetration depth of 2.0 cm represents the bandwidth of the zero line because this zone softens slightly because of additional impoundment of seepage water and therefore absorbs a greater amount of dump seepage water. If it is taken into consideration that the mineral seal should be a barrier to harmful substances in the long term, the invention of a mineral seal with retention of harmful substances acquires very great importance.

I claim:

1. A process for sealing soil formations in which a mineral sealing layer of a cohesive soil is applied, with addition of pulverulent waterglass, and is compacted mechanically, said process comprising:

(a) preparing a homogeneous mixture from a cohesive soil having a water content in the wet region of the Proctor curve, with addition of a pulverulent aluminate-free agent which forms a soft gel, (b) homogeneously incorporating pulverulent waterglass after the agent which forms a soft gel has dissolved in the soil water, and (c) mechanically compacting the mixture.

2. A process according to claim 1, wherein the agent which forms a soft gel comprises sodium bicarbonate.

3. A process according to claim 1 wherein the pulverulent agent which forms a soft gel is used in an amount of 3 to 6% by weight, based on the free soil water.

4. A process according to claim 1, wherein the pulverulent waterglass is used in an amount of 3 to 6% by weight, based on the free soil water.

5. A process according to claim 1, wherein a weight ratio of agent which forms a soft gel to waterglass in the region of about 1:1 is used.

6. A process according to claim 1, wherein the dissolving of the agent which forms a soft gel is accelerated by mechanical compaction with simultaneous vibration.

7. A process according to claim 6, wherein a vibrating roll or vibrating plate is used.

8. A process according to claim 1, wherein after incorporation of the pulverulent waterglass in stage (b) and before carrying out the mechanical compaction (c), the mixture is left to stand for 1–4 hours.

9. A process according to claim 1, wherein a cohesive soil having a water content in the wet region of 92 to 95% of the Proctor curve is used.

10. A process according to claim 1, wherein a sodium waterglass is used.

* * * * *